United States Patent [19]

Sato et al.

[11] Patent Number: 5,061,761

[45] Date of Patent: Oct. 29, 1991

[54] POLYVINYL ESTER MACROMONOMER AND ITS USES

[75] Inventors: Toshiaki Sato; Takashi Ohnaga; Kaoru Ikeda, all of Kurashiki, Japan

[73] Assignee: Kuraray Co., Ltd., Kurashiki, Japan

[21] Appl. No.: 588,720

[22] Filed: Sep. 27, 1990

[30] Foreign Application Priority Data

Sep. 29, 1989 [JP] Japan ................................. 1-255974
Sep. 29, 1989 [JP] Japan ................................. 1-255980
Sep. 29, 1989 [JP] Japan ................................. 1-255981

[51] Int. Cl.$^5$ .............................................. C08F 8/34
[52] U.S. Cl. ................................ 525/329.8; 525/242; 525/329.7; 525/330.3; 525/330.4; 525/343; 525/346; 525/350; 525/355
[58] Field of Search ............... 525/242, 295, 346, 347, 525/350, 301, 329.7, 330.3, 330.4, 343, 355

[56] References Cited

U.S. PATENT DOCUMENTS 4,206,294  6/1980  Simms ................................. 525/301
4,699,950 10/1987  Sato ................................... 525/185

Primary Examiner—Joseph L. Schofer
Assistant Examiner—Fred Zitomer
Attorney, Agent, or Firm—Oblon, Spivak, McClelland, Maier & Neustadt

[57] ABSTRACT

Provided are polyvinyl ester macromonomers (A) having excellent polymerizability and highly controlled composition, structure and distribution of polymerization degree.

Also provided are polyvinyl alcohol macromonomers (B) obtained by solvolysis of the above polyvinyl ester macromonomers (A) and having excellent polymerizability and highly controlled composition, structure and distribution of polymerization degree.

Further provided are polymers (C) obtained by polymerization of the above polyvinyl ester macromonomers (A) and containing units from polyvinyl ester macromonomers having highly controlled composition, structure and distribution of polymerization degree. These polymers (C) are useful as compatibility improving agents, surface improving agents and like agents.

Still further provided are polymers (D) obtained by solvolysis of the above polymers (C) or by polymerization or copolymerization of the above polyvinyl alcohol macromonomers (B) and containing units from polyvinyl alcohol macromonomers having highly controlled composition, structure and distribution of polymerization degree. These polymers (D) are useful for decreasing viscosity of aqueous solutions of polymers at high concentrations, improving surface, preventing static charge and the like.

6 Claims, 5 Drawing Sheets

POLYVINYL ESTER MACROMONOMER AND ITS USES

BACKGROUND OF THE INVENTION

1. Field of the Invention

The present invention relates to polyvinyl ester macromonomers and their uses.

More specifically, the present invention relates to polyvinyl ester macromonomers usable as starting materials for graft polymers of which the composition, structure, molecular weight and the like are highly controlled, and to the uses thereof, i.e. polyvinyl alcohol macromonomers, polymers containing units from the polyvinyl ester macromonomers and polymers containing units from the polyvinyl alcohol macromonomers.

2. Description of the Prior Art

Macromonomers have been attracting much attention in recent years as starting materials for synthesizing highly controlled graft polymers and a large variety of macromonomers have been synthesized.

With respect to polyvinyl ester macromonomers, however, only a few synthesis examples have been reported. See for example Japanese Patent Application Laid-open No. 95215/1988 {hereinafter referred to as "Reference (A)"} for terminal-olefin macromonomers and J. Polymer Sci., Part C, Vol. 25, 175 (1987) {hereinafter referred to as "Reference (B)"} for terminal-styrene polyvinyl acetate macromonomers. These macromonomers have a drawback of low copolymerizability with other monomers, thereby hardly yielding polymers with high degree of polymerization. The polyvinyl acetate macromonomers described in Reference (B) have a drawback that their uses are significantly limited due to the presence of cationic groups in their linkage groups.

Also with respect to polyvinyl alcohol macromonomers, even including their precursors, only a few synthesis examples have been reported. For example hydrolysis of terminal-olefin polyvinyl acetate macromonomers (precursors) can give polyvinyl alcohol macromonomers {cf. Reference (A)}, which however have a drawback of low polymerizability and low copolymerizability with other monomers, thereby hardly yielding polymers with high degree of polymerization. There is known polyvinyl alcohol macromonomer obtained by hydrolyzing terminal-styrene polyvinyl acetate macromonomer (precursor) {cf. Reference (B)} and one obtained by hydrolyzing polydimethylaklylsylyl vinyl ether (precursor) {cf. Polymer Bulletin, 18, 473 (1987), hereinafter referred to as "Reference (C)"}. These macromonomers have low copolymerizability with other monomers due to steric hindrance produced by the terminal styrene, and the former macromonomer has a drawback that its uses are significantly limited due to the presence of cationic group in its linkage group part.

Japanese Patent Application Laid-open No. 89208/1986 {hereinafter referred to as "Reference (D)"} discloses polyvinyl alcohol macromonomers having at least 2 ester groups or amide groups at their linkage groups, which have drawbacks of low resistance to hydrolysis of the linkage groups and low polymerizability and copolymerizability with other monomers.

With respect to polymers containing units from polyvinyl ester macromonomers, which are obtained by polymerization of polyvinyl ester macromonomers, only those polymers that contain units from a terminal-styrene polyvinyl ester macromonomer are reported {cf. Reference (B)}. These polymers have low resistance to weather due to the presence of benzyl bonds in their linkage group parts, and hence their uses have, also from their linkage groups being of cationic nature, been significantly limited.

A number of examples have been reported for long with respect to branched polymers having polyvinyl alcohol as their branch and to branched polyvinyl alcohols, both of which present various interesting properties. However, on most of these polymers only the compositions are known, and it has thus been impossible with conventional process of polymerizing vinyl acetate in the presence of a trunk polymer and hydrolyzing the resulting graft polymer, to synthesize a polymer of which the composition, structure, molecular weight and the like are desirably controlled.

There have been reported in recent years the following polymers as polymers containing units from a polyvinyl alcohol macromonomer:

polymers containing units from a polyvinyl alcohol macromonomer, obtained by hydrolysis of polymers containing units from a terminal-styrene polyvinyl ester macromonomer {cf. Reference (B)}, polymers obtained by hydrolysis of terminal-styrene polydimethylalkylsilyl vinyl ether {cf. Reference (C)}, and polymers containing units from a polyvinyl alcohol macromonomer that contains at least 2 ester groups or amide groups at its linkage group parts {cf. Reference (D)}.

These polymers, however, all have the following drawbacks:

The polymers disclosed in Reference (B) that contain units from a polyvinyl alcohol macromonomer have low weather resistance due to the presence of benzyl bonds at the linkage group parts originating in the polyvinyl alcohol macromonomer, and hence their uses will be, also from the cationic nature of their linkage groups, significantly limited. The polymers disclosed in Reference (C) that contain units from a polyvinyl alcohol macromonomer have low copolymerizability because of insufficient solubility of dimethylalkylsilyl vinyl ether that is the starting material for their synthesis in polymerization solvents, and hence their composition, structure and molecular weight cannot desirably be controlled. The polymers disclosed in Reference (D) that contain units from a polyvinyl alcohol macromonomer are low in the resistance to alkali of their linkage groups originating in the polyvinyl alcohol macromonomer.

SUMMARY OF THE INVENTION

Accordingly, an object of the present invention is to provide a polyvinyl ester macromonomer (A) having excellent polymerizability and sharp distribution of polymerization degree.

Another object of the present invention is to provide a polyvinyl alcohol macromonomer (B) having excellent polymerizability and sharp distribution of polymerization degree.

Still another object of the present invention is to provide a polymer (C) containing units from a polyvinyl ester macromonomer having sharp distribution of polymerization degree, obtained by the polymerization of the above-mentioned polyvinyl ester macromonomer (A).

Yet another object of the present invention is to provide a polymer (D) containing units from a polyvinyl alcohol macromonomer having sharp distribution of polymerization degree, obtained by the solvolysis of the above-mentioned polymer (C) containing units from a polyvinyl ester macromonomer or the polymerization of the above-mentioned polyvinyl alcohol macromonomer (B).

The present invention have found, as a result of intensive studies, that the above objects can be achieved by:

a polyvinyl ester macromonomer (A) represented by the general formula (I)

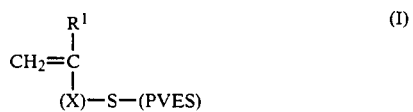

wherein $R^1$ represents a hydrogen atom or a methyl group, (X) represents either one of the following linkage groups $(X_1)$ and $(X_2)$ of which $R^2$ bonds to S:

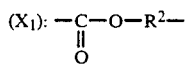

wherein $R^2$ represents an alkylene group having 2 to 20 carbon atoms which may have branches,

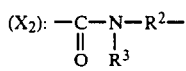

wherein $R^2$ is the same as defined above, $R^3$ represents a hydrogen atom or an alkyl group having not more than 4 carbon atoms, and (PVES) represents a monovalent polyvinyl ester containing units from a vinyl ester and having a number-average degree of polymerization of at least 3;

a polyvinyl alcohol macromonomer (B) represented by the general formula (II)

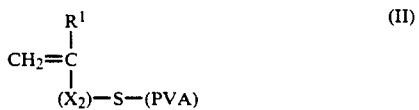

wherein $R^1$ represents a hydrogen atom or a methyl group, $(X_2)$ represents the following linkage group of which $R^2$ bonds to S:

wherein $R^2$ represents an alkylene group having 2 to 20 carbon atoms which may have branches, $R^3$ represents a hydrogen atom or an alkyl group having not more than 4 carbon atoms, and (PVA) represents a monovalent polyvinyl alcohol containing units from vinyl alcohol and having a number-average molecular weight of at least 3;

a polymer (C) containing units from a polyvinyl ester macromonomer and having a weight-average molecular weight of at least $10^3$, said unit being represented by the general formula (III)

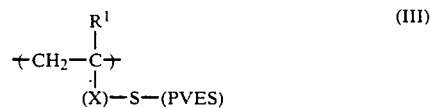

wherein $R^1$, (X) and (PVES) are the same as defined for the general formula (I); and a polymer (D) containing units from a polyvinyl alcohol macromonomer and having a weight-average molecular weight of at least $10^3$, said unit being represented by the general formula (IV)

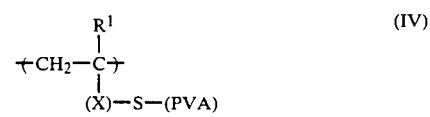

wherein $R^1$ and (X) are the same as defined for the general formula (I) and (PVA) is the same as defined for the general formula (II).

DETAILED DESCRIPTION OF THE PREFERRED EMBODIMENTS

Figure 1:
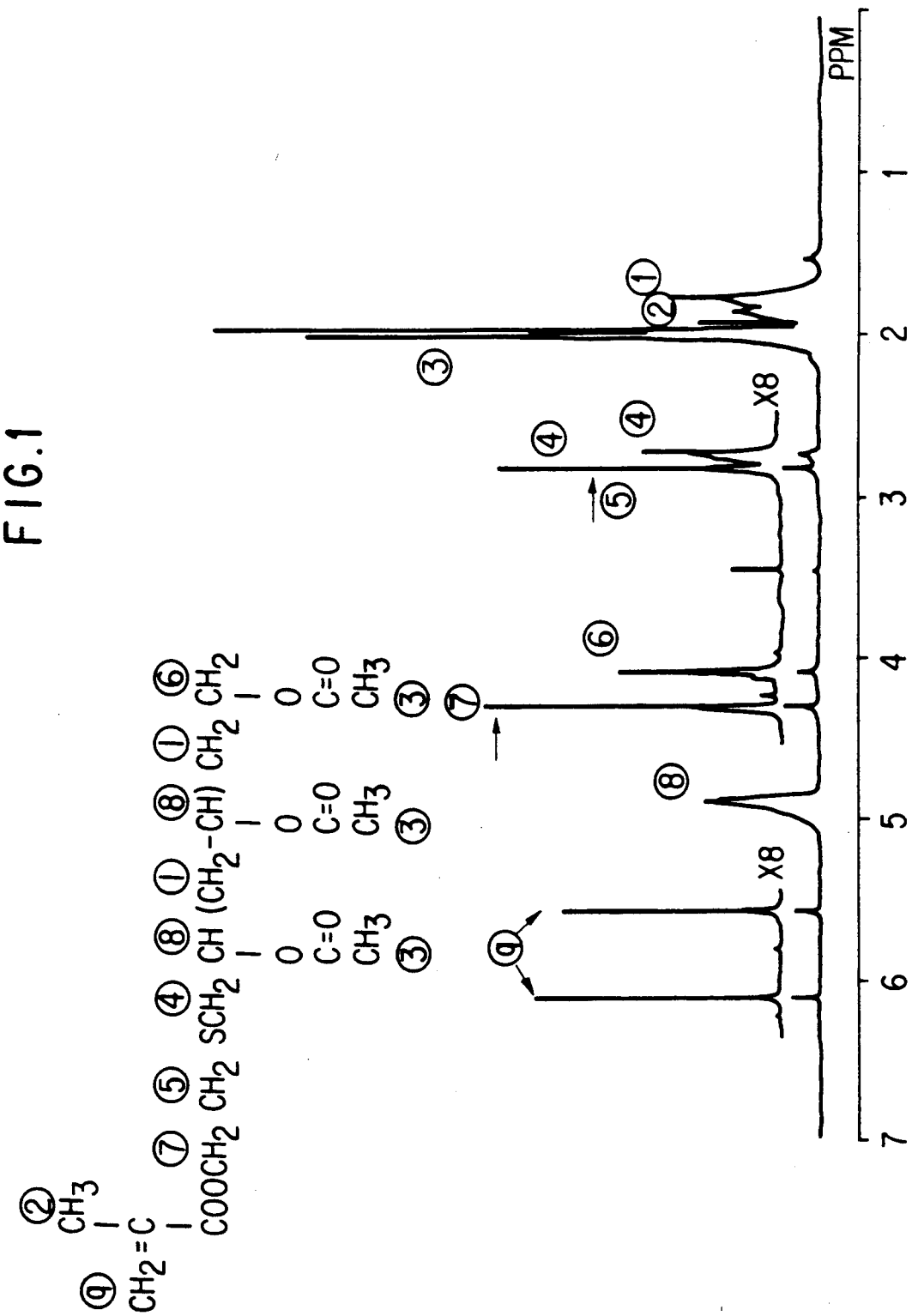
FIG. 1 shows the NMR spectrum of the polyvinyl ester macromonomer (A-1) obtained in Example 1.

A more complete appreciation of the invention and many of the attendant advantages thereof will be readily obtained as the same become better understood by reference to the following detailed description.

The polyvinyl ester macromonomer (A) of the present invention is described in detail.

The macromonomer (A) is composed of a polymerizable double bond part at one end of the molecule thereof, a polyvinyl ester part and a part linking these two parts, and is represented by the general formula (I).

The polymerizable double bond part at one end is an acrylic ester, a methacrylic ester, an acrylamide or a methacrylamide, and connects to the polyvinyl ester part via sulfur atom through the following linkage group (X):

(X): either one of the following linkage groups $(X_1)$ and $(X_2)$ of which $R^2$ bonds to S:

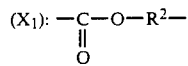

wherein R² represents an alkylene group having 2 to 20 carbon atoms which may have branches, examples of which are —(CH$_2$)$_2$—, —(CH$_2$)$_3$—, —(CH$_2$)$_6$—, —(CH$_2$)$_{10}$—, —(C$_6$H$_{13}$)CH$_2$— and —CH(C$_{10}$H$_{21}$)CH$_2$—, and R³ represents a hydrogen atom or an alkyl group having not more than 4 carbon atoms, examples of which are CH$_3$, C$_2$H$_5$, C$_3$H$_7$ and C$_4$H$_9$.

The polyvinyl ester part (PVES) is a monovalent polyvinyl ester having a number-average degree of polymerization of at least 3, preferably 3 to 500, more preferably 5 to 300, having a sharp molecular weight distribution represented by a ratio of the weight-average degree of polymerization to number-average degree of polymerization of preferably not more than 3, and having a vinyl ester unit content of at least 30 mol %, preferably at least 50 mol %. If the number-average degree of polymerization of the polyvinyl ester part is higher than 500, the polyvinyl ester macromonomer might be of low polymerizability in some cases; and if the ratio of the weight-average degree of polymerization to number-average degree of polymerization (hereinafter sometimes referred to as "distribution of polymerization degree" or "$\overline{Pw}/\overline{Pn}$") of the polyvinyl ester is more than 3, the graft polymers obtained from the polyvinyl ester macromonomer (A) might not fully exert its features in some cases. The distribution of polymerization degree herein is determined by GPC. The conditions of GPC measurement are as follows; solvent: tetrahydrofuran (hereinafter abbreviated as THF), flow rate: 1.0 ml/min, at 25° C. If the content of vinyl ester units in the polyvinyl ester is less than 30 mol %, the graft polymers obtained from the polyvinyl ester macromonomer (A) might not fully exert their features in some cases.

Examples of the vinyl ester unit (hereinafter sometimes referred to as "VES") are units derived from vinyl formate, vinyl acetate, vinyl propionate, vinyl t-butyrate, vinyl pivalate, vinyl valerate, vinyl caprate, vinyl Versatate, vinyl laurate, vinyl stearate, vinyl benzoate, vinyl trifluoroacetate and vinyl trichloroacetate.

The polyvinyl ester may also be a copolymer. In this case, any comonomer {hereinafter sometimes referred to as (CM1)}, for example comonomers that can be introduced by copolymerization, can be used. Examples of the comonomer (CM1) are olefins such as ethylene, propylene, 1-butene and isobutene; acrylic acid and its salts; acrylic esters such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate and octadecyl acrylate; methacrylic acid and its salts; methacrylic esters such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate and octadecyl methacrylate; acrylamide derivatives such as acrylamide, N-methylacrylamide, N-ethylacrylamide, N,N-dimethylacrylamide, diacetonacrylamide, acrylamidepropanesulfonic acid and its salts, acrylamidepropyldimethylamine and its salts and quaternary salts, and N-methylolacrylamide and its derivatives; methacrylamide derivatives such as methacrylamide, N-methylmethacrylamide, N-ethylmethacrylamide, methacrylamidepropanesulfonic acid and its salts, methacrylamidepropyldimethylamide and its salts and quaternary salts, and N-methylolmethacrylamide and its derivatives; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether and stearyl vinyl ether; nitriles such as acrylonitrile; vinyl halides such as vinyl chloride, vinylidene chloride, vinyl fluoride and vinylidene fluoride; allyl compounds such as allyl acetate and allyl chloride; maleic acid and its salts and esters; itaconic acid and its salts and esters; vinylsilyl compounds such as vinyltrimethoxysilane; isopropenyl acetate and N-vinylpyrrolidone.

The polyvinyl ester macromonomer (A-1) in which the linkage group (X) is (X$_1$) is obtained by for example reacting a (meth)acryloyl halide with a polyvinyl ester having hydroxyl group at one end of the molecule thereof. Examples of the (meth)acryloyl halide are (meth)acryloyl chloride and (meth)acryloyl bromide, of which (meth)acryloyl chloride is preferred. The polyvinyl ester having hydroxyl group at one end of the molecule thereof can be obtained by for example polymerizing a vinyl ester alone or with a comonomer while continuously adding dropwise a thiol having hydroxyl group. The reaction of a (meth)acryloyl halide with a polyvinyl ester having hydroxyl group at one end of the molecule thereof is conducted with the polyvinyl ester dissolved in a solvent sufficiently dewatered and having no active hydrogen, such as methylene chloride, benzene, toluene, xylene or THF. The hydrogen halide that forms is caught by an alkaline substance such as sodium hydrogencarbonate, pyridine, triethylamine or triethanolamine, excluding those which may hydrolyze the vinyl ester unit. The reaction is conducted by for example gradually adding dropwise an acryloyl halide or methacryloyl halide to a solution containing the polyvinyl ester and an alkaline substance, with stirring. The reaction time is 1 to 20 hours, preferably 1 to 10 hours. The reaction temperature is not higher than 60° C., preferably not higher than 40° C. to suppress side reactions and not lower than −20° C. The amount of the (meth)acryloyl halide fed is 100 to 1000 moles based on 100 moles of the polyvinyl ester and preferably 100 to 500 moles on the same basis.

The polyvinyl ester macromonomer (A-2) in which the linkage group (X) is (X$_2$) can be obtained by for example reacting a polyvinyl ester having amino group at one end of the molecule thereof with a (meth)acryloyl halide. Examples of the (meth)acryloyl halide include (meth)acryloyl chloride and (meth)acryloyl bromide, of which (meth)acryloyl chloride is preferred. The polyvinyl ester having amino group at one end of the molecule thereof is obtained by for example polymerizing a vinyl ester alone or with a comonomer while continuously adding a thiol having amino group that is protected with an optional protecting group to prepare a (co)polymer of the vinyl ester having a protected amino group at one end and then removing the protecting group. Examples of the protecting group for amino group are t-butylcarbamate group, benzylcarbamate group and trifluoroacetamide group. They are preferred, since they can readily be removed later.

The reaction of the polyvinyl ester having amino group at one end of the molecule thereof with the (meth)acryloyl halide is conducted in the same manner that is employed for the production of a polyvinyl ester macromonomer (A-1).

According to the present invention, there can be obtained polyvinyl ester macromonomers (A) having sharp distribution of polymerization degree and excellent polymerizability resulting from their double bond part having a highly polymerizable structure of acrylic ester, methacrylic ester, acrylamide or methacrylamide.

Graft polymers utilizing the polyvinyl ester macromonomers (A), which have sharp distribution of polymerization degree, of the present invention are therefore more useful than graft polymers obtained by conventional processes. The macromonomers (A) are useful, besides as starting materials for graft polymers, as improving agents for fibers and films, composite materials, photopolymerizable materials, surface improving agents and the like.

The polyvinyl alcohol macromonomer (B), which is one of the uses of the polyvinyl ester macromonomer (A) of the present invention is next described in detail.

The polyvinyl alcohol macromonomer (B) of the present invention is composed of a polymerizable double bond part at one end of the molecule thereof, a polyvinyl alcohol part and a linkage part connecting these two parts, and is represented by the general formula (II).

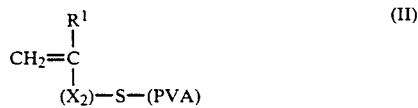

The polymerizable double bond part at one end of the molecule thereof is either acrylamide or methacrylamide, and connects to the polyvinyl alcohol part via sulfur atom through the following linkage group ($X_2$), of which $R^2$ bonds S:

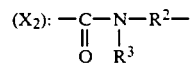

wherein $R^2$ and $R^3$ are the same as defined for ($X_2$) of the general formula (I).

The polyvinyl alcohol part (PVA) is a monovalent polyvinyl alcohol having a number-average degree of polymerization of at least 3, preferably 3 to 500, more preferably 5 to 300, and having a sharp molecular weight distribution represented by a ratio of the weight-average degree of polymerization to number-average degree of polymerization of preferably not more than 3.0. This polyvinyl alcohol has a vinyl alcohol unit content of at least 10 mol %, preferably at least 30 mol %, more preferably at least 50 mol %. If the number-average degree of polymerization of the polyvinyl alcohol part is higher than 500 or the ratio of the weight-average degree of polymerization to number-average degree pf polymerization (hereinafter sometimes referred to as "distribution of polymerization degree" or "$\overline{Pw}/\overline{Pn}$") of the polyvinyl alcohol is more than 3.0, the graft polymers obtained from the polyvinyl alcohol macromonomer (B) might not fully exert their features in some cases. The distribution of polymerization degree herein is determined by GPC on a polyvinyl acetate obtained by acetylation of the polyvinyl alcohol macromonomer (B) in a mixture of pyridine and acetic anhydride. The conditions of the GPC measurement are as follows; solvent: THF, flow rate: 1.0 ml/min, at 25° C. If the content of vinyl alcohol units in the poly-vinyl alcohol (PVA) is less than 10 mol %, the graft polymers obtained from the polyvinyl alcohol macromonomer (B) might not fully exert their features in some cases. The polyvinyl alcohol (PVA) may contain, besides vinyl alcohol units, any comonomer units, for which the afore-mentioned vinyl ester (VES) units and/or comonomer (CM1) units for the polyvinyl ester macromonomer (A) can optionally be used.

The polyvinyl alcohol macromonomer (B) is obtained by for example solvolysis of a polyvinyl ester macromonomer (A-2) in which the linkage group (X) is ($X_2$).

The solvolysis of a polyvinyl ester macromonomer (A-2) to obtain the polyvinyl alcohol macromonomer (B) is conducted with the polyvinyl ester macromonomer (A-2) dissolved or dispersed in an appropriate solvent, by addition of an alkali or acid. The solvolysis herein means hydrolysis or alcoholysis with an alkali or acid. Examples of the solvent used are aromatic compounds such as benzene, toluene and xylene; alcohols such as methanol, ethanol, propanol and butanol; cyclic ethers such as tetrahydrofuran and dioxane; ketones such as acetone, methyl ethyl ketone and methyl isobutyl ketone; dimethyl sulfoxide; N,N-dimethylformamide; N,N-dimethylacetamide and water. These solvents are used singly or in combination. Examples of the usable acid are sulfuric acid, hydrochloric acid and p-toluenesulfonic acid, and those of the usable alkali are hydroxides of alkali metals and alkali earth metals, such as sodium hydroxide and potassium hydroxide; alkali metal alcolates such as sodium methylate, sodium ethylate, potassium methylate, potassium ethylate and potassium t-butylate; ammonia and amines such as trimethylamine; as well as ion exchange resins and ion exchange membranes of anionic and cationic types. The reaction temperature is 5° to 100° C., preferably 15° to 80° C. for the purpose of suppressing side reactions. If the hydrolysis conditions are too severe, amido groups constituting the polyvinyl ester macromonomer (A-2) will decompose, whereby the desired polyvinyl alcohol macromonomer cannot be obtained. In view of the above, it is preferred in the present invention that alcoholysis, particularly methanolysis, with alkali catalyst be conducted.

According to the present invention, there can be obtained polyvinyl alcohol macromonomers (B) having sharp distribution of polymerization degree and excellent polymerizability resulting from their double bond part having a highly polymerizable structure of acrylamide and methacrylamide.

Graft polymers utilizing the polyvinyl alcohol macromonomers (B) which have sharp distribution of polymerization degree of the present invention are therefore more useful than graft polymers obtained by conventional processes. The macromonomers (B) are useful, besides as starting materials for graft polymers, as improving agents for fibers and films, composite materials, photopolymerizable materials, surface improving agents and the like.

Described next in detail is the polymer (C) containing units from a polyvinyl ester macromonomer, which is another use of the polyvinyl ester macromonomer (A) of the present invention.

The polymer (C) of the present invention is a homopolymer or copolymer of the polyvinyl ester macromonomer (A) and contains units represented by the general formula (III) and derived from the polyvinyl ester macromonomer (A).

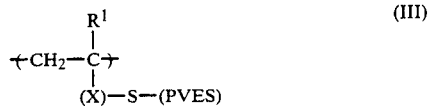

(III)

The copolymer means a polymer composed of polyvinyl ester macromonomer units and units from at least one comonomer, and has a polyvinyl ester macromonomer unit content of preferably at least 3% by weight, more preferably at least 5% by weight. If the polyvinyl ester macromonomer unit content is less than 3% by weight, the features of the polymer of the present invention might not be fully exerted in some cases.

The polymer (C) of the present invention has the features of improved fluidity, improved formability and improved compatibility with other polymers, when it contains as small an amount of 3 to 5% by weight of units from a polyvinyl ester macromonomer of which the polyvinyl ester (PVES) has highly controlled vinyl ester unit content, highly controlled degree of polymerization and highly controlled distribution of polymerization degree. The polymer (C) naturally possesses the above features when it contains as large an amount as, for example, 50 to 100% by weight of the units from the polyvinyl ester macromonomer.

The content of the polyvinyl ester macromonomer units in the polymer (C) is suitably selected depending on the intended use of the polymer (C). The weight-average molecular weight of the polymer (C) must be at least $10^3$, preferably $10^3$ to $10^7$, and is selected appropriately depending on the use of the polymer (C).

The polyvinyl ester macromonomer unit of the polymer (C) of the present invention is represented by the aforementioned general formula (III) derived from the polyvinyl ester macromonomer (A) represented by the afore-mentioned general formula (I). The group $R^1$, linkage group (X) and polyvinyl ester (PVES) in the general formula (III) are the same as defined for the general formula (I).

Where the polymer (C) is a copolymer containing a polyvinyl ester macromonomer unit represented by the general formula (III), the comonomer (hereinafter sometimes referred to as CM2) for the comonomer units contained therein can be from any radical-polymerizable monomer.

Examples of the comonomer (CM2) are olefins such as ethylene, propylene, 1-butene and isobutene; acrylic acid and its salts; acrylic esters such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, octadecyl acrylate, 2-hydroxyethyl acrylate and fluoroalkyl acrylate; methacrylic acid and its salts; methacrylic esters such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate, octadecyl methacrylate, 2-hydroxyethyl methacrylate and its phosphoric ester, 2-dimethylaminoethyl methacrylate and its salts and quaternary salts, diethylaminoethyl methacrylate and its salts and quaternary salts, (2-hydroxy)dimethylaminopropyl methacrylate and its salts and quaternary salts, 3-trimethoxysilylpropyl methacrylate and fluoroalkyl methacrylate; styrenes such as styrene, p-methylstyrene, α-methylstyrene, chloromethylstyrene, p-styrenesulfonic acid and its salts and p-hydroxystyrene and its derivatives; vinyl esters such as vinyl formate, vinyl acetate, vinyl propionate, vinyl butyrate, vinyl pivalate, vinyl versatate, vinyl laurate, vinyl stearate and vinyl benzoate; acrylamide derivatives such as acrylamide, N-methylacrylamide, N-ethylacrylamide, N,N-dimethylacrylamide, diacetonacrylamide, acrylamidepropanesulfonic acid and its salts, acrylamidepropyldimethylamine and its salts and quaternary salts, and N-methylolacrylamide; methacrylamide derivatives such as methacrylamide, N-methylmethacrylamide, N-ethylmethacrylamide, methacrylamidepropanesulfonic acid and its salts, methacrylamidepropyldimethylamide and its salts and quaternary salts, and N-methylolmethacrylamide; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether and stearyl vinyl ether; nitriles such as acrylonitrile; vinyl halides such as vinyl chloride, vinylidene chloride, vinyl fluoride and vinylidene fluoride; allyl compounds such as allyl acetate, allyl chloride and allyl alcohol; maleic anhydride, maleic acid and its salts and esters; fumaric acid and its salts and esters, itaconic acid and its salts and esters; isopropenyl acetate; N-vinylimidazole and N-vinylpyrrolidone; as well as macromonomers such as polyoxyalkylene, polyoxyalkylene phosphoric acid ester, polystyrene, polymethylmethacrylate and polysiloxane.

The polymer (C) of the present invention, containing units from a polyvinyl ester macromonomer is produced by polymerizing a polyvinyl ester macromonomer (A) alone or by copolymerizing the macromonomer (A) with other radical-polymerizable comonomer. Radical polymerization is generally employed for the polymerization, including, as classified according to the means for generating radicals, a process utilizing a conventional initiator, photopolymerization, radiation polymerization and plasma polymerization, and as classified according to the process, bulk polymerization, solution polymerization and suspension polymerization. Advantageously used among the above are bulk polymerization, solution polymerization and suspension polymerization, utilizing an initiator. Examples of the initiator are azo compounds, peroxides and hydroperoxides, and more concretely, 2,2'-azobisisobutyronitrile, 2,2'-azobis(4-methoxy-2,4-dimethylvaleronitrile), 2,2'-azobis(2,4-dimethylvaleronitrile), benzoyl peroxide, lauroyl peroxide, t-butylhydroperoxide, cumene hydroperoxide and potassium persulfate. Also usable are redox systems which combines a hydroperoxide with a reducing agent, examples of which are combinations of hydrogen peroxide or potassium persulfate with l-ascorbic acid or rongalite. Any solvent can be used for the polymerization insofar as it dissolves or disperses the polyvinyl ester macromonomer (A) and comonomer (CM2) and dissolves the initiator used. Examples of the solvent are aromatic compounds such as benzene, toluene and xylene; alcohols such as methanol, ethanol, propanol and butanol; cyclic ethers such as tetrahydrofuran and dioxane; ketones such as acetone methyl ethyl ketone and methyl isobutyl ketone; esters such as ethyl acetate and propyl acetate; dimethyl sulfoxide; N,N-dimethylformamide; N,N-dimethylacetamide and water. These solvents are used singly or in combination. The polymerization can be conducted by any one of batch process, semi-batch process and continuous process and is suitably selected depending on the combination of monomers used and the scale of polymerization. The polymerization temperature depends on the desired properties of the obtainable polymer, and the monomers, initiator and solvent used, and is generally in the range of from $-30°$ C. to 150° C.

In the polymer (C) of the present invention which contains units from a polyvinyl ester macromonomer, the content of the polyvinyl ester units constituting the branches, the degree of polymerization and the distribution of polymerization degree and, further, the molecular weight, of the polymer are controlled, which is different from those in the case of graft polymers obtained by conventional processes which comprises polymerizing a vinyl ester in the presence of various polymers. Consequently, control of the superstructure of the obtained polymers has become possible for the first time, and hence it is expected that quite efficient improvements be achieved in fluidity resulting from the introduction of branch molecules, and in compatibility with other polymers, thanks to the high compatibility of the polyvinyl ester used with other polymers.

The graft polymers of the present invention having the above characteristics can be used as base materials for coatings, molded resins, adhesives, paints and like articles, as well as additives such as compatibility improving agents, dispersing agents and surface improving agents. They are also usable as materials for fibers, films, composite materials and the like.

Lastly, described in detail is the polymer (D) containing units from a polyvinyl alcohol macromonomer, which is still another use of the polyvinyl ester macromonomer (A) of the present invention.

The polymer (D) of the present invention is a polymer containing units represented by the general formula (IV) and derived from a polyvinyl alcohol macromoner (B), and has a weight average molecular weight of at least $10^3$.

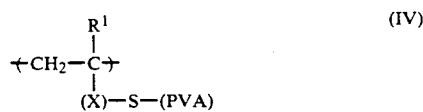

(IV)

The polymer (D) is obtained by solvoysis of the polymer or copolymer of a polyvinyl ester macromonomer (A) or by polymerization or copolymerization of a polyvinyl alcohol macromonomer (B). The copolymer means a polymer composed of polyvinyl alcohol macromonomer units and units from at least one comonomer, which has a polyvinyl alcohol macromonomer unit content of preferably at least 3% by weight, more preferably at least 5% by weight.

The polymer (D) of the present invention has the features of improved hydrophilic property and water solubility, lowered viscosity at high concentration and improved strength, when it contains as small an amount as 3 to 5% by weight of units from a polyvinyl alcohol macromonomer in which polyvinyl alcohol (PVA) has highly controlled vinyl alcohol unit content, degree of polymerization and distribution of polymerization degree. The polymer (D) naturally has the above features when it contains as large an amount as, for example, 50 to 100% by weight of the units from the polyvinyl alcohol macromonomer. However, if the content of the units from the polyvinyl alcohol macromonomer is less than 3% by weight, the above features might not be fully exerted in some cases.

The content of the polyvinyl alcohol macromonomer units in the polymer (D) is suitably selected depending on the intended used of the polymer (D). The weight-average molecular weight of the polymer (D) must be at least $10^3$, preferably $10^3$ to $10^7$, and is selected appropriately depending on the use of the polymer (D).

The polyvinyl alcohol marcromonomer unit of the polymer (D) of the present invention is represented by the general formula (IV). The group $R^1$ and linkage group (X) in the general formula (IV) are the same as defined for the general formula (I) and the polyvinyl alcohol (PVA) is the same as defined for the general formula (II). As the linkage group (X) for the polymer (D) of the present invention, however, those originating in methacrylic acid esters, acrylamide and methacrylamide are preferred.

Where the polymer (D) containing units from polyvinyl alcohol macromonomer is a copolymer, those comonomer units (CM2) used for the polymer (C) containing units from polyvinyl ester macromonomer can also be used here.

The polymer (D) of the present invention, containing units from a polyvinyl alcohol macromonomer is produced by solvolysis of the polymer (C) containing units from a polyvinyl ester macromonomer, or by polymerization of a polyvinyl alcohol macromonomer (B) alone or by copolymerization of the macromonomer (B) with other monomers.

The solvolysis of a polymer (C) containing units from a polyvinyl ester macromonomer to obtain the polymer (D) of the present invention containing units from a polyvinyl alcohol macromonomer is conducted with the polymer (C) containing units from the polyvinyl ester macromonomer dissolved or dispersed in an appropriate solvent, by addition of an alkali or acid. The solvolysis herein means hydrolysis or alcoholysis with an alkali or acid. Examples of the solvent used are aromatic compounds such as benzene, toluene and xylene; alcohols such as methanol, ethanol, propanol and butanol; cyclic ethers such as tetrahydrofuran and dioxane; ketones such as acetone, methyl ethyl ketone and methyl isobutyl ketone; dimethyl sulfoxide; N,N-dimethylformamide; N,N-dimethylacetamide and water. These solvents are used singly or in combination. Examples of the usable acid are sulfuric acid, hydrochloric acid and p-toluenesulfonic acid, and those of the usable alkali are hydroxides of alkali metals and alkali earth metals, such as sodium hydroxide and potassium hydroxide; alkali metal alcolates such as sodium methylate, sodium ethylate, potassium methylate, potassium ethylate and potassium t-butylate; ammonia and amines such as trimethylamine; as well as ion exchange resins and ion exchange membranes of anionic and cationic types. The reaction temperature is 5° to 100° C., preferably 15° to 80° C. for the purpose of suppressing side reactions. If the hydrolysis conditions are too severe, ester groups constituting not only vinyl ester groups but also the polyvinyl ester macromonomer units will decompose, whereby the desired polymer cannot be obtained. In view of the above, it is preferred in the present invention that alcoholysis, particularly methanolysis, with alkali catalyst be conducted.

The polymer (D) of the present invention containing units from a polyvinyl alcohol marcromonomer can also be produced by polymerizing a polyvinyl alcohol macromonomer (B) alone or by copolymerizing the macromonomer (B) with other radical-polymerizable comonomer. Radical polymerization is generally employed for the polymerization, including, as classified according to the means for generating radicals, a process utilizing a conventional initiator, photopolymerization, radiation polymerization and plasma polymerization, and as classified according to the process, bulk polymerization, solution polymerization and suspension polymerization. Advantageously used among the above are bulk polymerization, solution polymerization and suspension polymerization, utilizing an initiator. Examples of the initiator are azo compounds, peroxides and hydroperoxides. Concrete examples of the azo compounds are 4-4'-azobis(4-cyanovaleric acid), 2,2'-azobis[2-methyl-N-(2-hydroxyethyl)-propionamide], 2,2'-azobis[2-(5-methyl-2-imidazolin-2-yl)propane], 2,2'-azobis(2-methyl-N-phenylpropionamide)dihydrochloride and 2,2'-azobis-(2-methylpropionamide)dihydrochloride. Concrete examples of the peroxide and the hydroperoxide are the benzoyl peroxide, lauroyl peroxide, t-butylhydroperoxide, cumene hydroperoxide and potassium persulfate. Also usable are redox systems which combines a hydroperoxide with a reducing agent, examples of which are combinations of hydrogen peroxide or potassium persulfate with l-ascorbic acid or rongalite. Any solvent can be used for the polymerization insofar as it dissolves or disperses the polyvinyl alcohol macromonomer (B) and comonomer (CM2) and dissolves the initiator used. Examples of the solvent are water, dimethyl sulfoxide, dimethylformamide, alcohols such as methanol and ethanol and water. These solvents are used singly or in combination. The polymerization can be conducted by any one of batch process, semi-batch process and continuous process and is suitably selected depending on the combination of monomers used and the scale of polymerization. The polymerization temperature depends on the desired properties of the obtainable polymer, and the monomers, initiator and solvent used, and is generally in the range of from $-30°$ C. to $150°$ C.

In the polymer (D) of the present invention which contains units from a polyvinyl alcohol macromonomer, the content of the polyvinyl alcohol units constituting the branches, the degree of polymerization and the distribution of polymerization degree and, further, the molecular weight, of the polymer are controlled, which is different from those in the case of graft polymers obtained by conventional processes which comprises polymerizing a vinyl ester in the presence of various polymers and hydrolyzing the obtained polymers. Consequently, control of the superstructure of the obtained polymers has become possible for the first time, and hence it is expected that, by introduction of hydrophilic polyvinyl alcohol as branch molecule, improvements for various polymers be achieved quite efficiently in their hydrophilic property and solubility in water, and in decreasing their viscosity at high concentration.

The polymer (D) of the present invention has properties varying to a large extent depending on the contents of polyvinyl alcohol macromonomer units and the contents and property of the comonomer units contained. Thus, this polymer can be designed to be water-soluble, water dispersible or water-insoluble, and it is therefore expected that the polymer be applicable to a variety of end-uses corresponding to its designed properties.

Accordingly, the polymers (D) that are soluble or dispersible in water are used for processing paper, treating textiles and like purposes for which conventional water-soluble polymers are suited. In this case, the polymer (D) of the present invention is free from the drawbacks of conventional polyvinyl alcohols, i.e. instability and poor fluidity of aqueous solutions containing them, since the polymer (D) is of branched structure and not of linear one and the polyvinyl alcohol constituting the branch has a sharp distribution of polymerization degree.

Where the polymers (D) are water-insoluble, they are usable for improving the surface of hydrophobic materials, for antistatic purposes, for materials in the medical field, and for like purposes, while introducing hydrophilic polyvinyl alcohol into hydrophobic polymers. In this case also, it is expected that the polymer (D) of the present invention be applicable to and developed for unique end-uses different from those of graft polymers having conventional polyvinyl alcohol as the branch molecule, since the polyvinyl alcohol constituting the branch of the polymer (D) has a sharp distrubution of polymerization degree, thereby developing highly controlled structure.

Other features of the invention will become apparent in the course of the following descriptions of exemplary embodiments which are given for illustration of the invention and are not intended to be limiting thereof. In the Examples that follow, "parts" and "%" mean "parts by weight" and "% by weight" respectively, unless otherwise specified.

EXAMPLES

Synthesis Example 1

A reaction vessel equipped with a stirrer, a reflux condenser, a nitrogen gas inlet and a thermometer was charged with 2,400 parts of vinyl acetate monomer and 600 parts of methanol, and the vessel was deaerated by bubbling nitrogen gas for 15 minutes. Separately, a thiol solution for initial addition was prepared by dissolving 0.78 part of 2-mercaptoethanol in 50 parts of methanol, a thiol solution for continuous addition by adding methanol to 60 parts by volume of 2-mercaptoethanol to a total volume of 100 parts, and an initiator solution by dissolving 1.81 parts of 2,2'-azobisisobutyronitrile in 50 parts of methanol, and these solutions were substituted with nitrogen by bubbling nitrogen gas.

The reaction vessel was heated and, when the inside temperature reached 60° C., the separately prepared thiol solution for initial addition and initiator solution were added in this order, to start polymerization. Immediately thereafter, addition of the thiol solution for continuous addition was started to continue polymerization. The continuous addition of thiol was conducted at a rate, the targets being as shown in the table below, corresponding to the increase of the solid concentration in the reaction vessel with the proceeding of polymerization. Samples were taken and checked for solid concentration from time to time.

| Solid conc. (%) | 10 | 20 | 30 | 40 | 50 |
|---|---|---|---|---|---|
| Accumulated volume added (parts) | 15.5 | 31.3 | 47.2 | 63.1 | 79.0 |

The polymerization was conducted for 3 hours under continuous addition of thiol, and then terminated by cooling. At this time the solid concentration was 51.0% and the total amount of the thiol solution continuously added was 82.0 parts by volume. Then, unreacted vinyl acetate was removed under reduced pressure at 30° C. with occasional addition of methanol, to obtain a polyvinyl acetate solution in methanol. A part of the solution was poured into ether to recover polyvinyl acetate, which was then purified by reprecipitation twice from acetone-ether and dried at 40° C. in vacuo. Proton NMR spectrometry (with GX-500 made by JEOL Ltd.; hereinafter the same will apply) on the thus purified polyvinyl acetate with the solvent of $CDCl_3$ revealed that this was a polyvinyl acetate having a number-average degree of polymerization of 31 and having a structure where hydroxyl group was present at one end of the molecule.

Synthesis Example 2

A reaction vessel equipped with a stirrer, a reflux condenser, a nitrogen gas inlet and a dropping funnel was charged with 9.25 parts of 2-aminoethanethiol and 50 parts of 2-methyl-2-propanol, and the vessel was deaerated by bubbling nitrogen gas for 30 minutes. With the temperature of the reaction vessel kept at 0° C., 26.2 parts of di-tert-butyl dicarbonate was gradually added dropwise with stirring. After the addition, the system was heated under reflux for 30 minutes. An aqueous ammonium chloride solution was added to the reaction mixture, and the resulting mixture was extracted with ethyl acetate. The extract was washed with an aqueous sodium hydrogen carbonate and then dried over magnesium sulfate, followed by distilling off of the olvent, to give a crude product. The crude product obtained was purified by distillation in vacuo under conditions of 0.1 mm Hg and 60° C. to give 16.1 parts of N-tert-butoxycarbonyl-2-aminoethanethiol.

A reaction vessel equipped with a stirrer, a reflux condenser, a nitrogen gas inlet and a thermometer was charged with 240 parts of vinyl acetate monomer and 60 parts of methanol, and the vessel was deaerated by bubbling nitrogen gas for 15 minutes. Separately, a thiol solution for initial addition was prepared by dissolving 0.177 part of N-tert-butoxycarbonyl-2-aminoethanethiol in 50 parts of methanol, a thiol solution for continuous addition by adding methanol to 30 parts of N-tert-butoxycarbonyl-2-aminoethanethiol to a total volume of 50 parts, and an initiator solution by dissolving 0.22 parts of 2,2'-azobisisobutyronitrile in 50 parts of methanol, and these solutions were substituted with nitrogen by bubbling nitrogen gas.

The reaction vessel was heated and, when the inside temperature reached 60° C., the separately prepared thiol solution for initial addition and initiator solution were added in this order, to start polymerization. Immediately thereafter, addition of the thiol solution for continuous addition was started to continue polymerization. The continuous addition of thiol was conducted at a rate, the targets being as shown in the table below, corresponding to the increase of the solid concentration in the reaction vessel with the proceeding of polymerization. Samples were taken and checked for solid concentration from time to time.

| Solid conc. (%) | 10 | 20 | 30 | 40 |
|---|---|---|---|---|
| Accumulated volume added (parts) | 7.0 | 14.1 | 21.5 | 29.2 |

The polymerization was conducted for 3 hours under continuous addition of thiol, and then terminated by cooling. At this time the solid concentration was 35.6% and the total amount of the thiol solution continuously added was 28.8 parts by volume. Then, unreacted vinyl acetate was removed under reduced pressure at 30° C. with occasional addition of methanol, to obtain a polyvinyl acetate solution in methanol. A part of the solution was poured into ether to recover polyvinyl acetate, which was then purified by reprecipitation twice from acetone-n-hexane and dried at 40° C. in vacuo. Proton NMR spectrometry on the thus purified polyvinyl acetate with the solvent of $CDCl_3$ revealed that this was a polyvinyl acetate having a number-average degree of polymerization of 22 and having a structure where N-tert-butoxycarbonylamino group was present at one end of the molecule.

A polyvinyl acetate solution in formic acid was prepared by adding 150 parts of 98% formic acid to 50 parts of the polyvinyl acetate obtained above and stirring the mixture. The solution thus prepared was allowed to stand at 10° C. for 24 hours and subjected twice to extraction with an aqueous chloroform-sodium chloride solution, and the chloroform layer was dried over magnesium sulfate. After removal of chloroform by distillation under reduced pressure, the residue was dried at 40° C. under reduced pressure, to give a polyvinyl acetate. Proton NMR spectrometry on the thus obtained polyvinyl acetate with the solvent of $CDCl_3$ revealed that this was a polyvinyl acetate having a number-average degree of polymerization of 22 and having a structure where ammonium group was present at one end of the molecule.

Example 1

The polyvinyl acetate solution in methanol obtained in Synthesis Example 1 was subjected to a treatment for removing methanol with toluene at 40° C. in vacuo, to give a solution in toluene of a polyvinyl acetate having hydroxyl group at its one end (concentration: 63.4%). A reaction vessel equipped with a stirrer, a reflux condenser and a dropping funnel was charged with 100 parts of this solution and 4.16 parts of pyridine and the contents were stirred well at room temperature. The dropping funnel was charged with 5.50 parts of a methacryloyl chloride that had just been purified by distillation and 10 parts of dewatered toluene and the contents were stirred well. This mixture was added dropwise at a constant rate over 3 hours to the contents of the vessel at room temperature with stirring. After completion of the addition, stirring was continued for further 3 hours at room temperature. Then, 1.70 parts of methanol was added, the mixture stirred for 1 hour, and, the mixture was, while 400 parts of toluene was being added in 4 parts, subjected to distillation at 40° C. in vacuo, to remove off toluene, methanol and other volatile matters. The white precipitate that formed was removed by filtration and a product solution in toluene was obtained. A part of the solution was poured into hexane to recover polyvinyl acetate, which was then purified by reprecipitation twice from acetone-hexane and dried at 40° C. in vacuo. Proton NMR spectrometry on the thus purified polyvinyl acetate with the solvent of $CDCl_3$ revealed that this was a polyvinyl acetate macromonomer having a number-average degree of polymerization of 31 and having the structure shown below where methacrylic ester was present at one end of the molecule. The NMR spectrum is shown in FIG. 1.

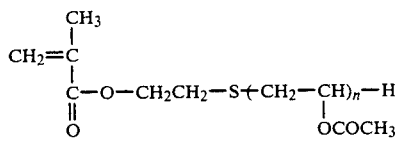

GPC using LC-6A (made by Shimadzu Corporation) connected with HSG-20H, HSG-40H and HSG-60S (all made by Shimadzu Corporation) with THF solvent and at a flow rate of 1.0 ml/min and 25° C. (hereinafter the same will apply) on this sample revealed the ratio of weight-average degree of polymerization to number-average degree of polymerization $\overline{Pw}/\overline{Pn}=2.2$.

Examples 2 through 5

A series of polyvinyl acetates having hydroxyl group at one end and having different degrees of polymerization were synthesized using 2-mercaptoethanol in the same manner as in Synthesis Example 1. Polyvinyl acetate macromonomers having methacrylic ester at one end of the molecules thereof were synthesized from these polyvinyl acetates in the same manner as in Example 1. The synthesis conditions and the results are shown in Table 1.

TABLE 1

| Ex-ample | Synthesis conditions | | | Polyvinyl acetate macromonomer (A) | |
|---|---|---|---|---|---|
| | OH-terminat-ed PVAc[1] (parts) | Pyri-dine (parts) | MAC[2] (parts) | Number-av. deg. of polym. of (PVAc) | $\overline{Pw}/\overline{Pn}$ |
| 2 | 70 | 11.7 | 15.5 | 11 | 2.1 |
| 3 | 62 | 2.0 | 2.63 | 57 | 2.2 |
| 4 | 60 | 0.84 | 1.12 | 131 | 2.2 |
| 5 | 52 | 0.38 | 0.51 | 250 | 2.3 |

[1] Polyvinyl acetate having hydroxyl group at one end of the molecule thereof.
[2] Methacryloyl chloride Example 6

A polyvinyl acetate having hydroxyl group at one end was synthesized using 1-n-decyl-2-mercaptoethanol in the same manner as in Synthesis Example 1. A polyvinyl acetate macromonomer shown below having methacrylic ester at one end of the molecule thereof was synthesized from the above polyvinyl acetate in the same manner as in Example 1. The synthesis conditions and the results are shown in Table 2.

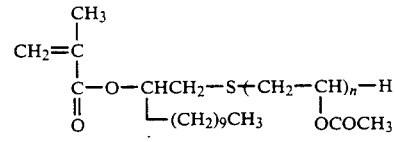

TABLE 2

| Ex-ample | Synthesis conditions | | | Polyvinyl acetate macromonomer (A) | |
|---|---|---|---|---|---|
| | OH-terminat-ed PVAc[1] (parts) | Pyri-dine (parts) | MAC[2] (parts) | Number-av. deg. of polym. of (PVAc) | $\overline{Pw}/\overline{Pn}$ |
| 6 | 62 | 3.93 | 5.19 | 29 | 2.1 |

[1] Polyvinyl acetate having hydroxyl group at one end of the molecule thereof.
[2] Methacryloyl chloride Examples 7 through 9

A series of polyvinyl acetate copolymers having hydroxyl group at one end and having different number-average degrees of polymerization were synthesized using 2-mercaptoethanol in the same manner as in Synthesis Example 1. Polyvinyl acetate copolymer macromonomers having the structure shown below and having methacrylate or acrylate at one end of the molecules thereof were synthesized from the above polyvinyl acetate copolymers in the same manner as in Example 1. The synthesis conditions and the results are shown in Table 3.

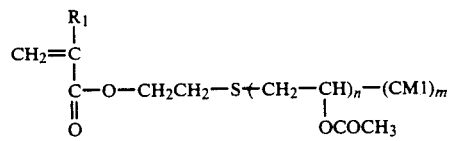

wherein $R^1$ represents a hydrogen atom or a methyl group and (CM1) represents a copolymerization unit, with the exception in Example 8 where (CM1) is replaced by a (VES) unit other than vinyl acetate.

TABLE 3

| Example | Synthesis conditions | | | | | | Polyvinyl acetate macromonomer (A) | |
|---|---|---|---|---|---|---|---|---|
| | OH-terminated PVAc copolymer[1] | | | | (Meth)acryloyl chloride | | | |
| | Structural formula of (CM1) or (VES) | Content of (CM1) (mol %) | Copolymer | Pyridine (parts) | Name[2] | (parts) | Number-average degree of polymerization of (PVES) | $\overline{Pw}/\overline{Pn}$ |
| 7 | -(CH₂C(CH₃))- \| COOCH₃ | 15 | 100 | 6.40 | AC | 7.33 | 28 | 2.2 |
| 8 | -(CH₂CH)- \| OCOC(CH₃)₃ | 32 | 100 | 2.73 | MAC | 3.62 | 58 | 2.2 |
| 9 | -(CH₂CH)- \| OCH(CH₃)₂ | 5 | 100 | 5.67 | AC | 6.50 | 32 | 2.3 |

[1] Vinyl acetate copolymer having hydroxyl group at one of the molecule thereof
[2] AC: Acryloyl chloride
MAC: Mathacryloyl chloride Example 10

A polyvinyl pivalate having hydroxyl group at one end and having a number-average degree of polymerization of 52 was synthesized in the same manner as in Synthesis Example 1 except for using t-butanol as polymerization solvent. A polyvinyl pivalate macromonomer having the structure shown below and having methacrylate at one end of the molecule thereof and having a number-average degree of polymerization of 52 was synthesized in the same manner as in Example 1 from the above polyvinyl pivalate. The synthesis conditions and the results are shown in Table 4.

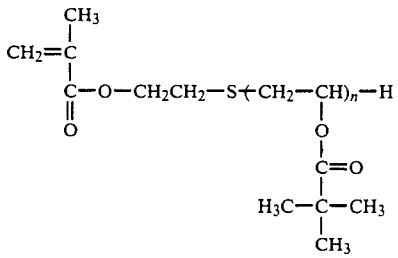

TABLE 4

| | Synthesis conditions | | | Polyvinyl pivalate macromonomer (A) | |
|---|---|---|---|---|---|
| Example | OH-terminated PVP[1] (parts) | Pyridine (parts) | MAC[2] (parts) | Number-av. deg. of polym. of (PVES) | Pw/Pn |
| 10 | 50 | 1.16 | 1.54 | 52 | 2.3 |

[1] Polyvinyl pivalate having hydroxyl group at one end of the molecule thereof.
[2] Methacryloyl chloride

Example 11

A reaction vessel equipped with a stirrer and a dropping funnel was charged with 2.86 parts of the polyvinyl acetate having ammonium group at its one end shown in Synthesis Example 2, 10 parts of methylene chloride and 10 parts of a saturated aqueous sodium hydrogencarbonate solution and the contents were stirred well at room temperature.

Figure 2:
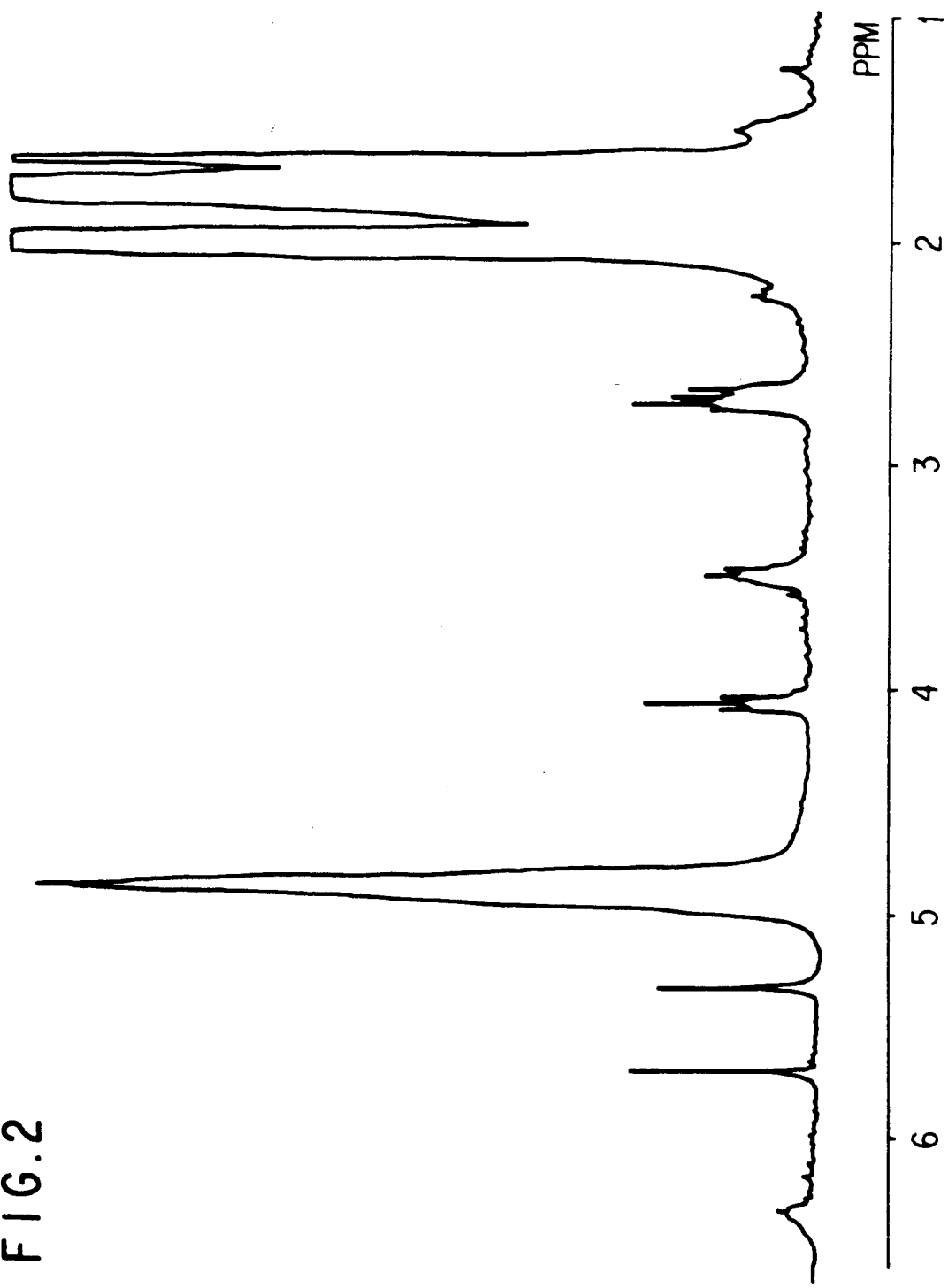
FIG. 2 shows the NMR spectrum of the polyvinyl ester macromonomer (A-2) obtained in Example 11.

The dropping funnel was charged with 0.4 parts of a methacryloyl chloride that had just been purified by distillation and 5 parts of methylene chloride and the contents were stirred well. This mixture was added dropwise over 10 minutes to the contents of the vessel at room temperature with stirring. After completion of the addition, stirring was continued for further 1 hour at room temperature. Then, the methylene chloride layer was separated from the reaction mixture by decantation and dried over magnesium sulfate. Then the solvent was distilled off, and a crude polyvinyl acetate was obtained. The crude product was then purified by reprecipitation twice from acetone-n-hexane and dried at 40° C. in vacuo. Proton NMR spectrometry on the thus purified polyvinyl acetate with the solvent of CDCl3 revealed that this was a polyvinyl acetate macromonomer having a number-average degree of polymerization of 22 and having the structure shown below where methacrylamide group was present at one end of the molecule. The NMR spectrum is shown in FIG. 2.

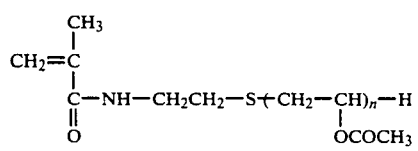

GPC conducted on this macromonomer in the same manner as in Example 1 revealed the ratio of weight-average degree of polymerization to number-average degree of polymerization $\overline{Pw}/\overline{Pn}=2.2$.

Examples 12 through 15

A series of polyvinyl acetates having different number-average degrees of polymerization and having N-tert-butoxycarbonylamino group at one end were synthesized using N-tert-butoxycarbonyl-2-aminoethanethiol in the same manner as in Synthesis Example 2. Polyvinyl acetate macromonomers having methacrylamide group at one end of the molecules thereof were synthesized from these polyvinyl acetates in the same manner as in Example 11. The synthesis conditions and the results are shown in Table 5.

TABLE 5

| | Synthesis conditions | | | Polyvinyl acetate macromonomer (A) | |
|---|---|---|---|---|---|
| Example | amino group-terminated PVAc[1] (parts) | Saturated aq. NaHCO3 solution (parts) | MAC[2] (parts) | Number-av. deg. of polym. of (PVES) | Pw/Pn |
| 12 | 2.52 | 10 | 0.80 | 10 | 2.0 |
| 13 | 2.41 | 10 | 0.15 | 62 | 2.3 |
| 14 | 5.20 | 10 | 0.16 | 115 | 2.2 |
| 15 | 11.2 | 10 | 0.19 | 220 | 2.3 |

[1] Polyvinyl acetate having ammonium group at one end of the molecule thereof.
[2] Methacryloyl chloride

Example 16

Example 1 was repeated except for using 0.35 part of acryloyl chloride instead of 0.4 parts of methacryloyl chloride to obtain a polyvinyl acetate macromonomer having acrylamide group at one end of the molecule thereof and having a number-average degree of polymerization of 22 and $(\overline{Pw}/\overline{Pn})=2.2$.

Example 17

A polyvinyl pivalate having a number-average degree of polymerization of 48 and having N-tert-butoxycarbonylamide group at one end was synthesized in the same manner as in Synthesis Example 2 except for using t-butanol as polymerization solvent. A polyvinyl pivalate macromonomer having methacrylamide group at its one end and having the structure shown below was synthesized in the same manner as in Example 11 from the above polyvinyl pivalate. The synthesis conditions and the results are shown in Table 6.

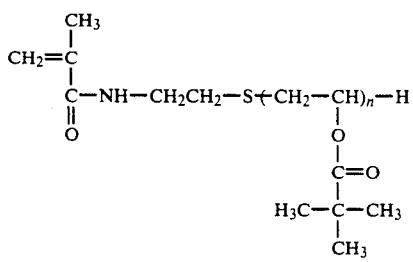

TABLE 6

| | Synthesis conditions | | | Polyvinyl acetate macromonomer (A) | |
|---|---|---|---|---|---|
| Example | amino group-terminated PVAc[1] (parts) | Saturated aq. NaHCO3 solution (parts) | MAC[2] (parts) | Number-av. deg. of polym. of (PVES) | Pw/Pn |

TABLE 6-continued

| 17 | 5.30 | 10 | 0.30 | 48 | 2.3 |

[1] Polyvinyl pivalate having ammonium group at one end of the molecule thereof.
[2] Methacryloyl chloride

Example 18

Figure 4:
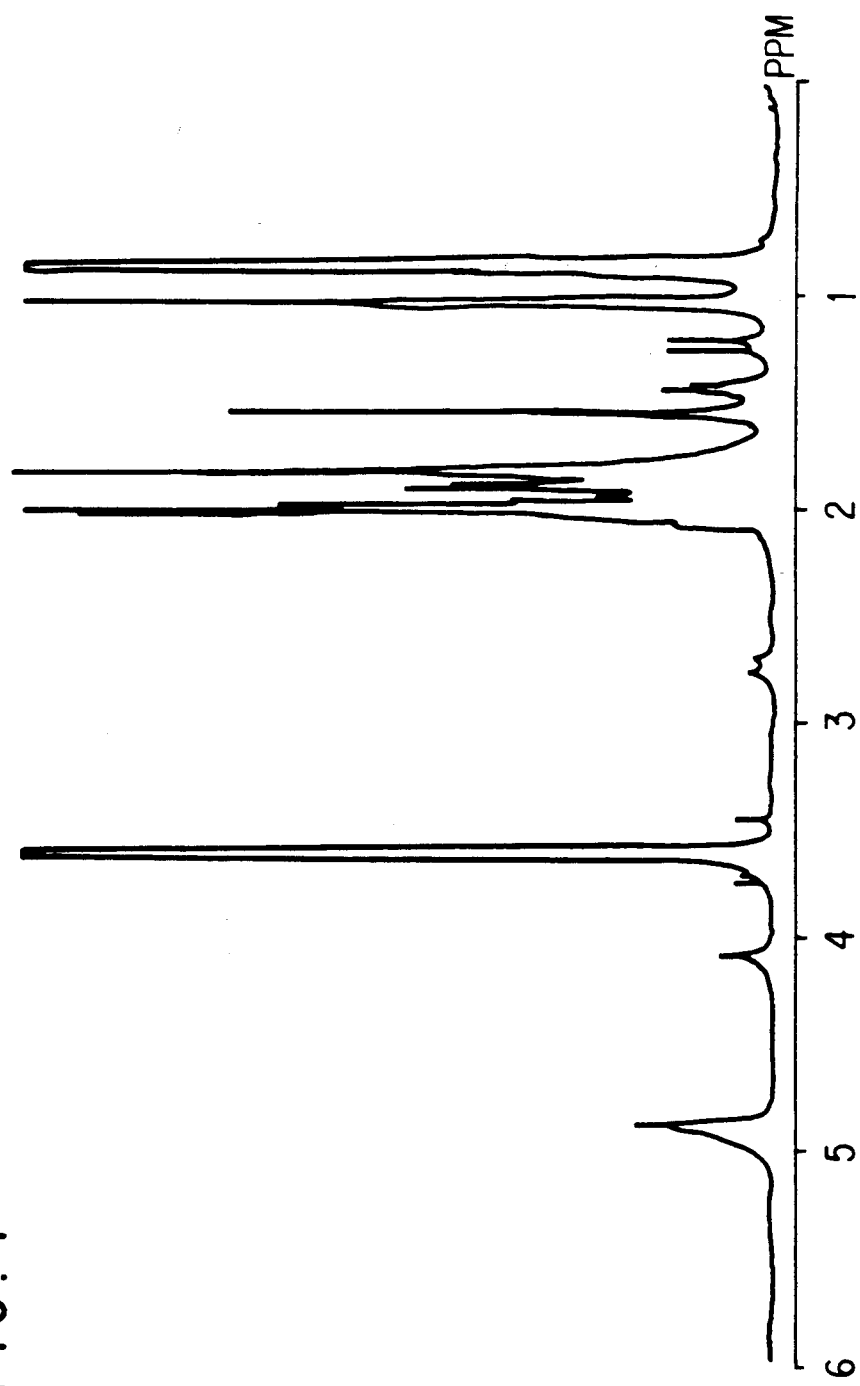
FIG. 4 shows the NMR spectrum of the polymer (C) containing units from a polyvinyl ester macromonomer and obtained in Example 18.
Figure 5:
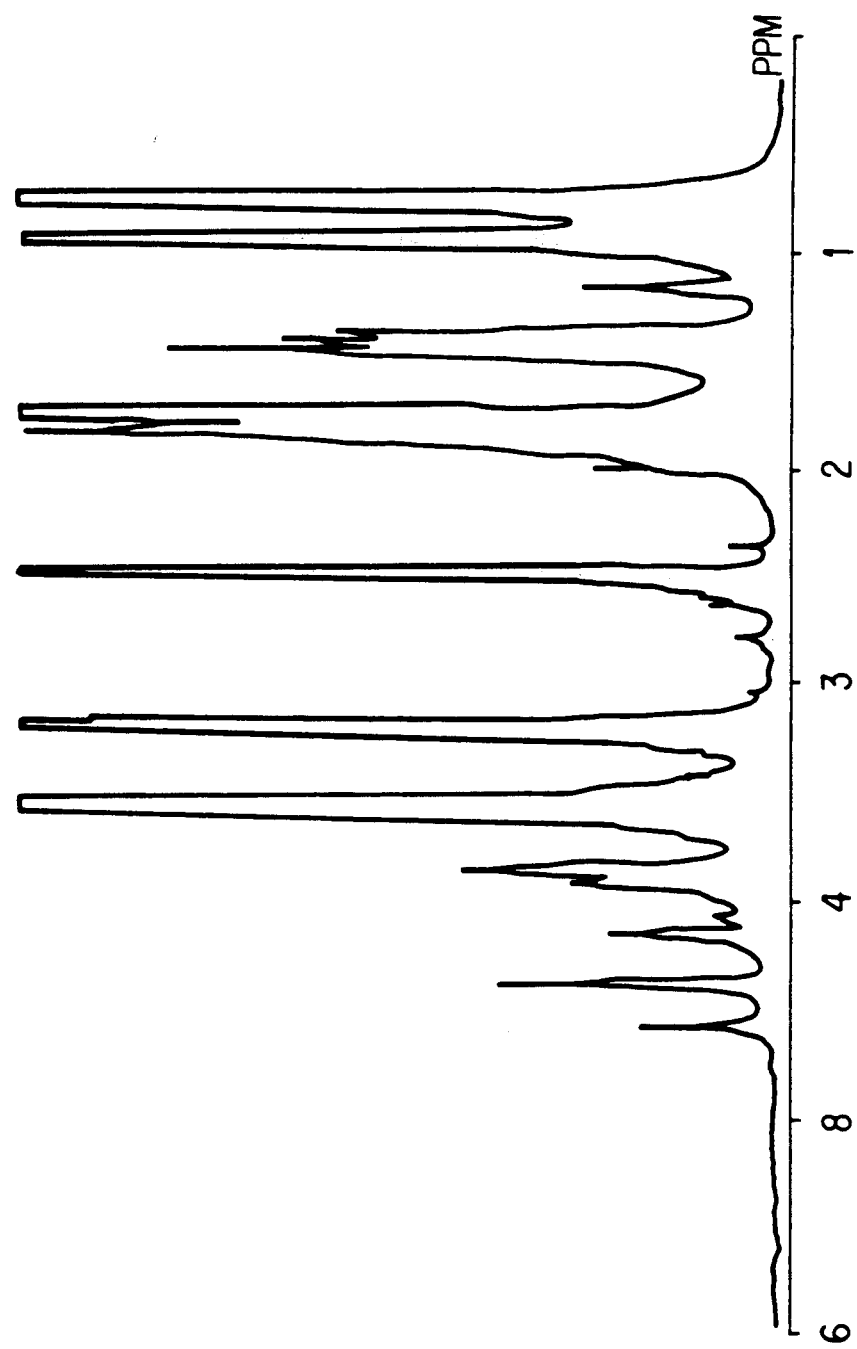
FIG. 5 shows the NMR spectrum of the polymer (D) containing units from a polyvinyl alcohol and obtained in Example 44.

A reaction vessel equipped with a stirrer, a reflux condenser, a nitrogen gas inlet and a thermometer was charged with 50 parts of the polyvinyl acetate macromonomer synthesized in Example 1, 100 parts of methyl methacrylate and 120 parts of toluene and the vessel was substituted with nitrogen by bubbling nitrogen gas at a room temperature. The heating of the reaction vessel was started and, when the inside temperature reached 60° C., an initiator solution prepared by dissolving 0.15 part of 2,2'-azobisisobutyronitrile in 30 parts of toluene and substituting the solution with nitrogen was added to start polymerization. Polymerization was continued for 5 hours with stirring, and then terminated by cooling. The polymerization mixture was poured into excess methanol to recover 55 parts of the polymer. The polymer thus obtained was purified by reprecipitation twice from acetone-methanol and dried at 60° C. in vacuo. Proton NMR spectrometry on the thus purified polymer with the solvent of CDCl$_3$ revealed that this was a polymer (C) containing units from the polyvinyl acetate macromonomer in an amount of 28.5 wt %. The NMR spectrum is shown in FIG. 4. GPC measurement on this polymer revealed a weight-average molecular weight as converted to polystyrene of $54 \times 10^4$.

Examples 19 through 34

A series of polymers (C) were prepared in the same manner as in Example 18 from the polyvinyl ester macromonomers (A) synthesized in Examples 1 through 10. The conditions and the results are shown in Table 7.

TABLE 7

| | Components charged for polymerization[1] | | | | Analysis results of polymer (C) | |
|---|---|---|---|---|---|---|
| Example | Polyvinyl ester macromonomer obtained in: (parts) | Comonomer[2] (CM2) (parts) | Solvent (parts) | Initiator[3] (parts) | Content of polyvinyl ester macromonomer units[4] (wt %) | Weight-average molecular weight ($\times 10^4$) |
| 19 | Example 2 100 | Styrene 200 | Toluene 300 | AIBN 1.20 | 40.5 | 4.7 |
| 20 | Example 3 100 | HEMA 100 | Methanol 200 | AIBN 0.20 | 43.5 | 41.2 |
| 21 | Example 4 100 | MAM 20 | Methanol 120 | AIBN 1.20 | 86.2 | 0.85 |
| 22 | Example 5 100 | MMA 400 | Toluene 500 | AIBN 0.50 | 14.7 | 36.2 |
| 23 | Example 6 100 | LMA 200 | Toluene 300 | AIBN 0.30 | 15.8 | 63.2 |
| 24 | Example 1 100 | 2-EHMA 300 | Toluene 400 | AIBN 0.40 | 12.8 | 59.0 |
| 25 | Example 1 100 | MAA 10 | Methanol 110 | AIBN 0.11 | 84.3 | 15.7 |
| 26 | Example 1 100 | POEMA 50 | Methanol 150 | AIBN 0.15 | 69.7 | 37.0 |
| 27 | Example 1 100 | — | Methanol 50 | AIBN 0.50 | 100 | 23.1 |
| 28 | Example 7 100 | MAA 100 | Toluene 100 | BPO 0.20 | 41.2 | 37.2 |
| 29 | Example 8 100 | — | Methanol 50 | AIBN 0.20 | 100 | 17.1 |
| 30 | Example 9 100 | HEMA 100 | Methanol 100 | AIBN 0.05 | 42.1 | 160 |
| 31 | Example 2 100 | MA 300 | Toluene 400 | AIBN 0.20 | 20.1 | 65.2 |
| 32 | Example 4 100 | VAC 100 | Methanol 200 | AIBN 0.20 | 72.0 | 27.0 |
| 33 | Example 1 100 | AN 50 | Toluene 150 | AIBN 0.15 | 52.5 | 43.5 |
| 34 | Example 10 100 | MMA 100 | Toluene 200 | AIBN 0.25 | 40.1 | 36.8 |

[1] Polymerization temperature: 60° C.
[2] Comonomer (CM2)
MMA: Methyl methacrylate POEMA: Polyoxyethylene monomethacrylate
HEMA: Hydroxyethyl methacrylate LMA: Lauryl methacrylate
2-EHMA: 2-Ethylhexyl methacrylate MAM: Methacrylamide
MAA: Methacrylic acid MA: Methyl acrylate
VAC: Vinyl acetate AN: Acrylonitrile
[3] Initiator
AIBN: 2,2'-Azobisisobutyronitrile BPO: Benzoyl peroxide
[4] Content of polyvinyl ester macromonomer units by weight

Example 35

A reaction vessel equipped with a stirrer, a nitrogen gas inlet, a reflux condenser and a thermometer was charged with 50 parts of the polyvinyl acetate macromonomer synthesized in Example 11, 100 parts of methyl methacrylate and 120 parts of toluene, and the vessel was substituted with N$_2$ by bubbling nitrogen gas at room temperature. The heating of the reaction vessel was started and, when the inside temperature reached 60° C., an initiator solution prepared by dissolving 0.15 part of 2,2'-azobisisobutyronitrile in 30 parts of toluene and substituting the solution with nitrogen was added to start polymerization. Polymerization was continued for 5 hours with stirring, and then terminated by cooling. The polymerization mixture was poured into excess methanol to recover 42 parts of the polymer. The polymer thus obtained was purified by reprecipitation twice from acetonemethanol and dried at 60° C. in vacuo. Proton NMR spectrometry on the thus purified polymer with the solvent of $CDCl_3$ revealed that this was a polymer (C) containing units from the polyvinyl acetate macromonomer in an amount of 20.2 wt %. GPC measurement on this polymer revealed a weight average molecular weight as converted to polystyrene of $47 \times 10^4$.

Examples 36 through 43

A series of polymers (C) were prepared in the same manner as in Synthesis Example 2 from the polyvinyl ester macromonomers synthesized in Examples 11 through 17. The conditions and the results are shown in Table 8.

tion, the gel was granulated. To the granules 50 parts of methanol was added and the mixture was allowed to stand for 24 hours at a room temperature to complete reaction. To the reaction mixture 30 parts of methyl acetate and 5 parts of water were added and the resulting mixture was heated at 50° C. for 1 hour, and then purified by Soxhlet-washing with methanol, to give a polymethyl methacrylate containing units from a polyvinyl alcohol macromonomer. Proton NMR spectrometry on the thus obtained polymer with the solvent of $D_6$-DMSO revealed that this polymer contained units from the polyvinyl alcohol macromonomer in an amount of 14.6 wt %. This polymer, in an amount of 0.1 part, was permitted to react in a mixed solution of 8 parts of acetic anhydride and 2 parts of pyridine at 105° C. for 20 hours with occasional stirring, to be reacetylated. The acetylated polymer was purified by reprecipitation three times from acetone-water. GPC measurement on the thus purified polymer revealed that this polymer had a weight-average molecular weight as converted to polystyrene of $50 \times 10^4$.

TABLE 8

| Example | Polyvinyl ester macro-monomer obtained in: (parts) | Comonomer[2] (CM2) (parts) | Solvent (parts) | Initi-ator[3] (parts) | Content of polyvinyl ester mac-romonomer units[4] (wt %) | Weight-average molecular weight ($\times 10^4$) |
|---|---|---|---|---|---|---|
| 36 | Example 12 100 | Styrene 200 | Toluene 300 | AIBN 1.20 | 45.2 | 5.2 |
| 37 | Example 13 100 | HEMA 100 | Methanol 200 | AIBN 0.20 | 37.6 | 35.0 |
| 38 | Example 14 100 | MAM 20 | Methanol 120 | AIBN 1.20 | 81.5 | 0.90 |
| 39 | Example 11 100 | — | Methanol 50 | AIBN 0.50 | 100 | 15.2 |
| 40 | Example 11 100 | POEMA 100 | Methanol 200 | AIBN 0.30 | 45.2 | 15.0 |
| 41 | Example 15 100 | MAA 10 | Methanol 110 | AIBN 0.11 | 76.2 | 13.8 |
| 42 | Example 16 100 | LMA 200 | Toluene 300 | LPO 0.50 | 13.2 | 57.5 |
| 43 | Example 17 100 | MMA 100 | Toluene 200 | AIBN 0.60 | 39.8 | 45.2 |

[1] Polymerization temperature: 60° C.
[2] Comonomer (CM2)
POEMA: Polyoxyethylene monomethacrylate
HEMA: Hydroxyethyl methacrylate  LMA: Lauryl methacrylate
MAM: Methacrylate  MAA: Methacrylic acid
[3] Initiator
AIBN: 2,2'-Azobisisobutyronitrile  LPO: Lauroyl peroxide
[4] Content of polyvinyl ester macromonomer units by weight

Example 44

A solution was prepared by dissolving 10 parts of the purified polymer containing polyvinyl ester macromonomer units and obtained in Example 18 in a mixed solvent of 75 parts of tetrahydrofuran and 13 parts of methanol. To the solution thus prepared 2 parts of a 10% sodium hydroxide solution in methanol was added with stirring at 40° C., to effect alcoholysis. After gella-

Examples 45 through 56

A series of polymers containing units from polyvinyl alcohol macromonomer were prepared in the same manner as in Example 44 by subjecting the polymers containing units from polyvinyl ester macromonomers shown in Examples 19 through 30 to methanolysis in the same manner as in Example 44. The conditions and the results are shown in Table 9.

TABLE 9

| | Synthesis of polymer containing polyvinyl ester macromonomer units[1] | | | | | Conditions and results of solvolysis reaction | | | |
|---|---|---|---|---|---|---|---|---|---|
| Example | Polyvinyl ester macro-monomer (A) obtained in: (parts) | Comonomer[2] (CM2) (parts) | Initi-ator[3] (parts) | Solvent (parts) | Consti-tution of polymer (C)[4] (wt %) | Solvent (parts) | Alkali[6] (parts) | Content of vinyl alcohol macromonomer units in polymer (D) (wt %) | Weight-average molecular weight ($\times 10^4$) |
| 45 | Example 2 | Styrene | AIBN | Toluene | 40.5 | THF/methanol | NaOH | 28.2 | 5.0 |

TABLE 9-continued

| Example | Polyvinyl ester macro-monomer (A) obtained in: (parts) | Comonomer[2] (CM2) (parts) | Initiator[3] (parts) | Solvent (parts) | Constitution of polymer (C)[4] (wt %) | Conditions[5] Solvent (parts) | Alkali[6] (parts) | Content of vinyl alcohol macromonomer units in polymer (D) (wt %) | Weight-average molecular weight (× 10⁴) |
|---|---|---|---|---|---|---|---|---|---|
| 46 | Example 3 100 | HEMA 200 | AIBN 1.2 | Methanol 300 | 43.5 | Methanol 75/13 | NaOH 2 | 28.8 | 40.1 |
| 47 | Example 4 100 | MAM 100 | AIBN 0.2 | Methanol 200 | 86.2 | Methanol 88 | NaOH 2 | 76.4 | 0.8 |
| 48 | Example 5 100 | MMA 20 | AIBN 1.20 | Toluene 120 | 14.7 | THF/methanol 88 | KOH 2 | 8.2 | 35.5 |
| 49 | Example 6 100 | LMA 400 | AIBN 0.50 | Toluene 500 | 15.8 | THF/methanol 75/13 | NaOH 2 | 8.7 | 61.6 |
| 50 | Example 1 100 | 2EHMA 200 | AIBN 0.30 | Toluene 300 | 12.8 | THF/methanol 75/13 | NaOH 2 | 7.3 | 57.5 |
| 51 | Example 1 100 | MAA 350 | AIBN 0.45 | Methanol 450 | 84.3 | Methanol 75/13 | NaOH 2 | 72.4 | 15.9 |
| 52 | Example 1 100 | POEMA 10 | AIBN 0.11 | Methanol 110 | 69.7 | Methanol 80.7 | NaOH 9.3 | 55.6 | 35.9 |
| 53 | Example 1 100 | — | AIBN 0.5 | Methanol 50 | 100 | Methanol 88 | NaOH 2 | 100 | 23.1 |
| 54 | Example 7 100 | MMA 100 | BPO 0.2 | Toluene 100 | 42.1 | THF/methanol 75/13 | NaOH 2 | 30.9 | 35.8 |
| 55 | Example 8 100 | — | AIBN 0.2 | Methanol 50 | 100 | Methanol 88 | NaOH 2 | 100 | 16.2 |
| 56 | Example 9 100 | HEMA 100 | AIBN 0.05 | Methanol 100 | 41.2 | Methanol 88 | NaOH 2 | 28.2 | 150 |

[1] Polymerization temperature: 60° C.
[2] Comonomer (CM2)
MMA: Methyl methacrylate  POEMA: Polyoxyethylene monomethacrylate
HEMA: Hydroxyethyl methacrylate  MAM: Methacrylamide
LMA: Lauryl methacrylate  2EHMA: 2-Ethylhexyl methacrylate
MAA: Methacrylic acid
[3] Initiator
AIBN: 2,2'-Azobisisobutyronitrile
BPO: Benzoyl peroxide
[4] Content of polyvinyl ester macromonomer units by weight
[5] Polymer concentration: 10 wt %, temperature: 40° C., time: 24 hrs
[6] 10% solution in methanol

Examples 57 through 63

A series of polymers containing units from polyvinyl alcohol macromonomer were prepared in the same manner as in Example 44 by subjecting the polymers containing units from polyvinyl ester macromonomers shown in Examples 11 through 16 to methanolysis in the same manner as in Example 44. The conditions and the results are shown in Table 10.

TABLE 10

| Example | Polyvinyl ester macro-monomer (A) obtained in: (parts) | Comonomer[2] (CM2) (parts) | Initiator[3] (parts) | Solvent (parts) | Constitution of polymer (C)[4] (wt %) | Conditions[5] Solvent (parts) | Alkali[6] (parts) | Content of vinyl alcohol macromonomer units in polymer (D) (wt %) | Weight-average molecular weight (× 10⁴) |
|---|---|---|---|---|---|---|---|---|---|
| 57 | Example 11 100 | MMA 100 | AIBN 0.15 | Toluene 150 | 11.0 | THF/methanol 75/13 | NaOH 2 | 11.0 | 45 |
| 58 | Example 12 100 | Styrene 200 | AIBN 1.2 | Toluene 300 | 45.2 | THF/methanol 75/13 | NaOH 2 | 28.5 | 5.0 |
| 59 | Example 13 100 | HEMA 100 | AIBN 0.2 | Methanol 200 | 37.6 | Methanol 88 | NaOH 2 | 22.6 | 42.0 |
| 60 | Example 14 100 | MAM 20 | AIBN 1.20 | Methanol 120 | 81.5 | Methanol 88 | NaOH 2 | 67.5 | 0.90 |
| 61 | Example 11 100 | — | AIBN 0.50 | Methanol 50 | 100 | Methanol 88 | NaOH 2 | 100 | 15.1 |
| 62 | Example 11 100 | POEMA 100 | AIBN 0.30 | Methanol 200 | 45.2 | Methanol 88 | KOH 2 | 29.5 | 15.0 |
| 63 | Example 16 | LMA | LPO | Toluene | 13.2 | THF/methanol | KOH | 7.0 | 56.2 |

TABLE 10-continued

| | Synthesis of polymer containing polyvinyl ester macromonomer units[1] | | | | | Conditions and results of solvolysis reaction | | | |
|---|---|---|---|---|---|---|---|---|---|
| Example | Polyvinyl ester macro-monomer (A) obtained in: (parts) | Comonomer[2] (CM2) (parts) | Initi-ator[3] (parts) | Solvent (parts) | Consti-tution of polymer (C)[4] (wt %) | Conditions[5] Solvent (parts) | Alkali[6] (parts) | Content of vinyl alcohol macromonomer units in polymer (D) (wt %) | Weight-average molecular weight (× 10⁴) |
| | 100 | 200 | 0.50 | 300 | | 75/13 | 2 | | |

[1]Polymerization temperature: 60° C.
[2]Comonomers (CM2)
POEMA: Polyoxyethylene monomethacrylate
HEMA: Hydroxyethyl methacrylate MAM: Methacrylamide
LMA: Lauryl methacrylate
[3]Initiators
AIBN: 2,2'-Azobisisobutyronitrile
LPO: Lauroyl peroxide
[4]Content of polyvinyl ester macromonomer units by weight
[5]Polymer concentration: 10 wt %, temperature: 40° C., time: 24 hrs
[6]10% solution in methanol

Example 64

Figure 3:
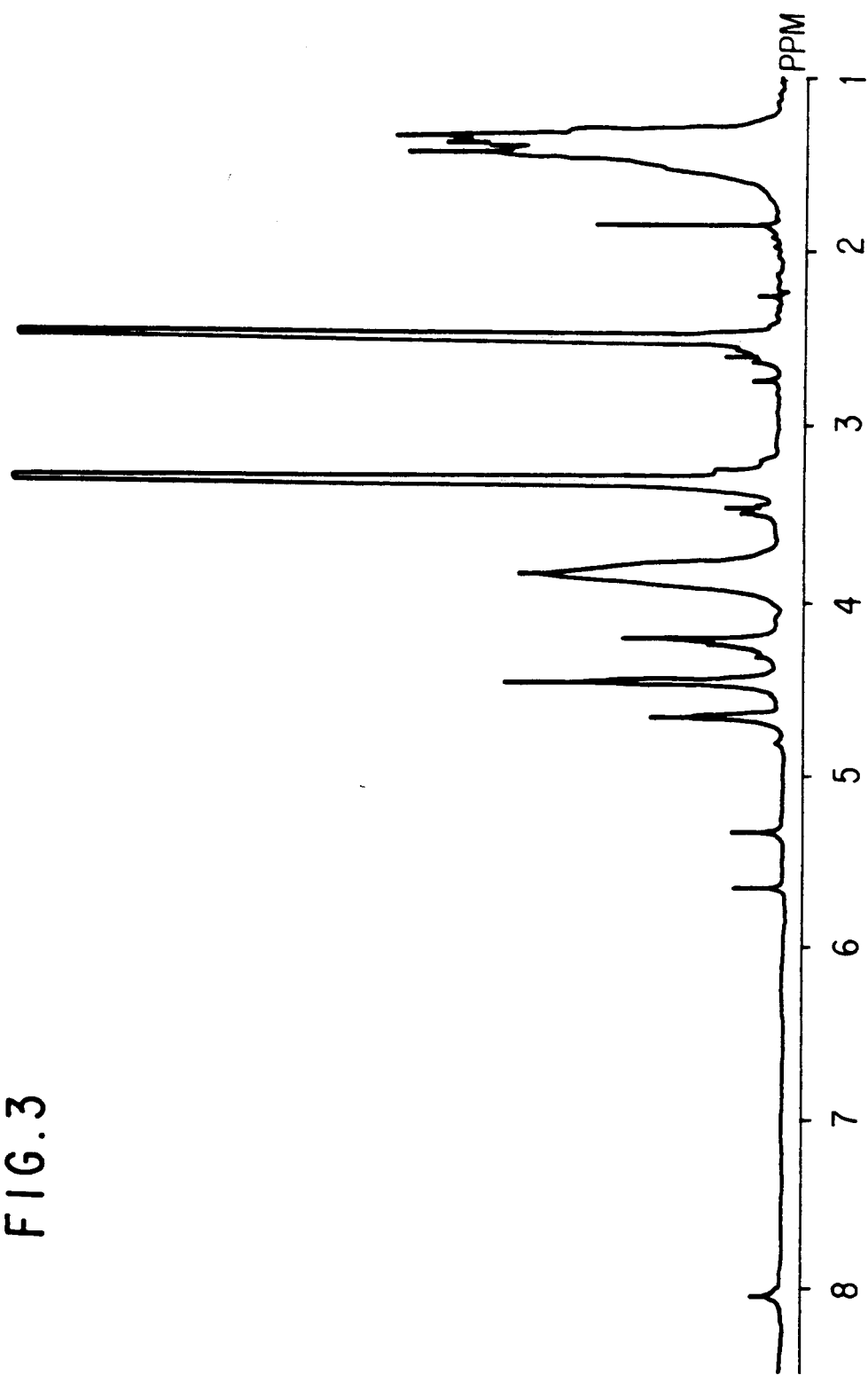
FIG. 3 shows the NMR spectrum of the polyvinyl alcohol macromonomer (B) obtained in Example 64.

A solution was prepared by dissolving 1.91 parts of the polyvinyl acetate macromonomer shown in Example 11 and having methacrylamide group at its one end in 30 parts of methanol. The solution was mixed with a separately prepared solution of 0.18 part of sodium hydroxide in 10 parts of methanol. The mixture was allowed to stand at room temperature for 1 day, and the solid that had deposited was collected by filtration. The solid was Soxhlet-extracted with methanol for 1 day and then dried at 40° C. in vacuo. The polyvinyl alcohol thus obtained was tested for Proton NMR with the solvent of DMSO-$D_6$, to be found to be a polyvinyl alcohol macromonomer having a degree of hydrolysis of 99.2 mol % and a number-average degree of polymerization 22 and having methacrylamide group at one end of the molecule thereof. FIG. 3 shows the NMR spectrum.

Examples 65 through 68

The polyvinyl ester macromonomers shown in Examples 12 through 15 were subjected to methanolysis in the same manner as in Example 64, to give polyvinyl alcohol macromonomers. The results are shown in Table 11.

TABLE 11

| Example | Starting material polyvinyl ester macro-monomer obtained in | Polyvinyl alcohol macromonomers (B) | |
|---|---|---|---|
| | | degree of hydrolysis (mol %) | Number-av. deg. of polymerization |
| 65 | Example 12 | 99.0 | 10 |
| 66 | Example 13 | 99.2 | 62 |
| 67 | Example 14 | 99.5 | 115 |
| 68 | Example 15 | 98.8 | 220 |

Example 69

A reaction vessel equipped with a stirrer, a reflux condenser, a nitrogen gas inlet and a thermometer was charged with 50 parts of the polyvinyl alcohol macromonomer synthesized in Example 64 and 300 parts of distilled water, and the polyvinyl alcohol macromonomer was dissolved at 70° C. with stirring. After cooling, 100 parts of acrylamide and 0.1 part of 2-mercaptomethanol were added, and the vessel was substituted with nitrogen by bubbling nitrogen gas at room temperature. The heating of the reaction vessel was started and, when the inside temperature reached 70° C., an initiator solution prepared by dissolving 0.30 part of potassium persulfate in 50 parts of distilled water and substituting the solution with nitrogen was added to start polymerization. Polymerization was continued for 5 hours with stirring, and then terminated by cooling. Part of the polymerization solution obtained was poured into excess methanol to recover the polymer. The polymer thus obtained was purified by reprecipitation twice from water-methanol and dried at 60° C. in vacuo. Proton NMR spectrometry on the thus purified polymer with the solvent of $D_6$-DMSO revealed that this was a polymer containing units from the polyvinyl alcohol macromonomer in an amount of 32.5 wt %.

Examples 70 through 72

Polymers (D) containing units from polyvinyl alcohol macromonomer were synthesized in the same manner as in Example 69, using the polyvinyl alcohol macromonomers synthesized in Examples 65 through 68. The conditions and results are shown in Table 12.

TABLE 12

| | Synthesis of polymer containing polyvinyl alcohol macromonomer units | | | | Analysis results of polymer (D) | |
|---|---|---|---|---|---|---|
| Example | Macromonomer obtained in (parts) | Comonomer[1] (CM2) (parts) | Initiator[2] (parts) | Solvent (parts) | Composition[3] (wt %) | Weight-average molecular weight (× 10⁴) |
| 70 | Example 65 100 | — | KPS 0.30 | water 400 | 100 | 21.2 |
| 71 | Example 66 50 | AA 50 | APS 0.30 | water 400 | 47.5 | — |
| 72 | Example 67 | MAPTAC | V-50 | water | 29.5 | — |

TABLE 12-continued

| Example | Synthesis of polymer containing polyvinyl alcohol macromonomer units | | | | Analysis results of polymer (D) | |
|---|---|---|---|---|---|---|
| | Macromonomer obtained in (parts) | Comonomer[1] (CM2) (parts) | Initiator[2] (parts) | Solvent (parts) | Composition[3] (wt %) | Weight-average molecular weight ($\times 10^4$) |
| | 30 | 70 | 0.30 | 400 | | |

Polymerization temperature: 70° C.
[1]Comonomers
AA: acrylic acid
MAPTAC: methacrylamidepropyltrimethylammonium chloride
[2]Initiators
KPS: potassium persulfate, APS: ammonium persulfate
V-50: 2,2'-azobis(2-amidinopropane) chloride
[3]Content of polyvinyl alcohol macromonomer units by weight

Example 73

The polymer (C) containing units from the polyvinyl ester macromonomer of the present invention and the polymer (D) containing units from the polyvinyl alcohol macromonomer of the present invention were very useful for various purposes. Some of examples with regard to the usefulness of the polymer (C) and polymer (D) are shown below.

(1) Usefulness of Polymer (C)

It was confirmed that the afore-mentioned polymer (C) containing units from the polyvinyl ester macromonomer obtained by the present invention was useful as a component or compatibility improving agent for polymer blends or polymer alloys. For example, the polymer (C), shown in Example 19, containing units from the polyvinyl acetate macromonomer in an amount of 40.5 wt % and units from styrene in an amount of 59.5 wt % was completely compatible with polymethyl methacrylate to give a transparent resin, and was also very useful as a compatibility improving agent between polystyrene and polymethyl methacrylate.

(2) Usefulness of Polymer (D)

(2-1) In the case of polymers (D) being water-insoluble as shown, for instance, in Example 44 or 45, these polymers alone or blends of these polymers were useful as antistatic resins, since they had appropriate moisture-absorptive property.

(2-2) In the case of polymers (D) being water-soluble as shown, for instance, in Example 53, they have what is known as "graft structure" and hence their aqueous solutions were of low viscosity even at high concentrations, compared with conventional polyvinyl alcohols. They were able to be used in aqueous solutions of high concentrations, and high-speed coating was possible with these aqueous solutions. Furthermore, these polymers (D) had high resistance to alkali, and aqueous solutions thereof had high stability of viscosity.

Obviously, numerous modifications and variations of the present invention are possible in light of the above teachings. It is therefore to be understood that within the scope of the appended claims, the invention may be practiced otherwise than as specifically described herein.

What is claimed is:

1. A polyvinyl ester macromonomer represented by the general formula (I)

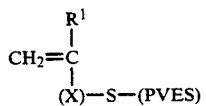
(I)

wherein $R^1$ represents a hydrogen atom or a methyl group, (X) represents either one of the following linkage groups $(X_1)$ and $(X_2)$ of which $R^2$ bonds to S:

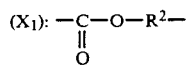

wherein $R^2$ represents an alkylene group having 2 to 20 carbon atoms which may have branches,

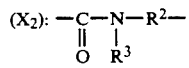

wherein $R^2$ is the same as defined above, $R^3$ represents a hydrogen atom or an alkyl group having not more than 4 carbon atoms, and (PVES) represents a monovalent polyvinyl ester containing units from a vinyl ester and having a number-average degree of polymerization of at least 3.

2. A polyvinyl ester macromonomer according to claim 1, said macromonomer having a ratio of its weight-average degree of polymerization to its number-average degree of polymerization of not more than 3.0.

3. A polyvinyl alcohol macromonomer represented by the general formula (II)

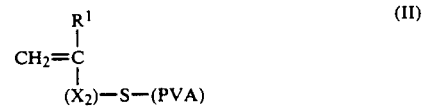
(II)

wherein $R^1$ represents a hydrogen atom or a methyl group, $(X_2)$ represents the following linkage group of which $R_2$ bonds to S:

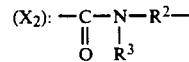

wherein $R^2$ represents an alkylene group having 2 to 20 carbon atoms which may have branches, $R^3$ represents a hydrogen atom or an alkyl group having not more than 4 carbon atoms, and (PVA) represents a monovalent polyvinyl alcohol containing units from vinyl alcohol and having a number-average degree of polymerization of at least 3.

4. A polyvinyl alcohol macromonomer according to claim 3, said macromonomer having a ratio of its weight-average degree of polymerization to its number-average degree of polymerization of not more than 3.0.

5. A polymer containing units from a polyvinyl ester macromonomer and having a weight-average molecular weight of at least $10^3$, said unit being represented by the general formula (III)

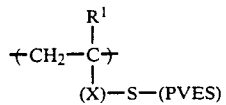

wherein $R^1$, (X) and (PVES) are the same as defined in claim 1.

6. A polymer containing units from a polyvinyl alcohol macromonomer and having a weight-average molecular weight of at least $10^3$, said unit being represented by the general formula (IV)

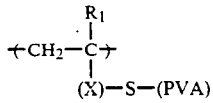

wherein $R_1$ and (X) are the same as defined in claim 1 and (PVA) is the same as defined in claim 3.

* * * * *